(12) United States Patent
Aggarwal et al.

(10) Patent No.: US 8,165,979 B2
(45) Date of Patent: Apr. 24, 2012

(54) SYSTEM AND METHOD FOR RESOURCE ADAPTIVE CLASSIFICATION OF DATA STREAMS

(75) Inventors: Charu C. Aggarwal, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/078,419

(22) Filed: Apr. 1, 2011

(65) Prior Publication Data

US 2011/0213740 A1    Sep. 1, 2011

Related U.S. Application Data

(63) Continuation of application No. 11/530,938, filed on Sep. 12, 2006, now Pat. No. 8,051,021.

(51) Int. Cl.
*G06N 5/00* (2006.01)
(52) U.S. Cl. ........................................................ 706/45
(58) Field of Classification Search ...................... 706/45
See application file for complete search history.

(56) References Cited

OTHER PUBLICATIONS

Charu Aggarwal ("An Efficient Subspace Sampling Framework for High-Dimensional Data Reduction, Selectivity Estimation, and Nearest-Neighbor Search" Oct. 2004).*
C. Aggarwal et al "On Demand Classification of Data Streams" KDD'04, Aug. 2004, pp. 503-508 ACM.*
C. Aggarwal, "Hierarchical Subspace Sampling: A Unified Framework for High Dimensional Data Reduction, Selectivity Estimation and Nearest Neighbor Search," ACM SIGMOD' 2002, Jun. 2002, pp. 452-463, ACM.
C. Aggarwal et al., "LOCUST: An Online Analytical Processing Framework for High Dimensional Classification of Data Streams," 2008, 10pgs, IEEE.
C. Aggarwal, "A Framework for Local Supervised Dimensionality Reduction of High Dimensional Data," Sep. 2006, pp. 358-369.
C. Aggarwal et al., "On Demand Classification of Data Streams," KDD'04, Aug. 2004, pp. 503-508, ACM.
Babcock, B., et al.; "Models and Issues in Data Stream Systems"; ACM PODS Conference, p. 1-30, 2002.
Breiman, Leo; "Random Forests"; Machine Learning, vol. 45, No. 1; p. 5-32, 2001.
Domingos, P., et al. "Mining High-Speed Data Streams"; ACM KDD Conference; p. 1-10; 2000.
Duda, R., et al.; "Pattern Classification and Scene Analysis"; Wiley Interscience; p. 10-39, 44-80, 203-248, 298-325, and 405-462; 1973.
M. Gaber et al.,"A Framework for Resource-aware Knowledge Discover in Data Streams: A Holistic Approach with its Application to Clustering," SAC'06, Apr. 2006, pp. 649-656, ACM.
H. Wang et al., "A Random Method for Quantifying Changing Distributions in Data Sources." PKDD 2005, LNAI 3721, 2005, pp. 684-691, Springer.
Hulten, G., et al.; "Mining Time-Changing Data Streams"; ACM KDD Conference; p. 1-10; 2001.
Jin, R., et al.; "Efficient Decision Tree Construction on Streaming Data"; ACM KDD Conference; p. 1-10; 2003.

(Continued)

*Primary Examiner* — Jeffrey A Gaffin
*Assistant Examiner* — Lut Wong
(74) *Attorney, Agent, or Firm* — Cantor Colburn LLP; William J. Stock

(57) ABSTRACT

A system and method for resource adaptive classification of data streams. Embodiments of systems and methods provide classifying data received in a computer, including discretizing the received data, constructing an intermediate data structure from said received data as training instances, performing subspace sampling on said received data as test instances and adaptively classifying said received data based on statistics of said subspace sampling.

11 Claims, 3 Drawing Sheets

OTHER PUBLICATIONS

J. Jun et al., "Subspace Clustering of Microarray Data Based on Domain Transformation," VDMB 2006, 2006, pp. 14-28, LNBI 4316, Springer.

IEEE; "The Authoritative Dictionary of IEEE Standards Terms"; Seventh Edition, Standards Information Network; IEEE Press, 2 pages, 2000.

M. Vlachos et al., "Resource Adaptive Periodicity Estimation of Streaming Data," Mar. 2006, pp. 1-18.

2006 VLDB Workshop on Data Mining in BioinformaticsBioInformatics; retrieved from the internet at: http://bio.informatics.indiana.edu/VLDB06/importantdates.html on Nov. 4, 2009; 2006.

Wang, Haixun; "Mining Concept-Drifting Data Streams Using Ensemble Classifiers"; ACM KDD Conference; p. 1-28; 2003.

A. Zhou et al., "Adaptively Detecting Aggregation Bursts in Data Streams," DASFAA 2005, LNCS 3453, 2005, pp. 435-446, Springer.

* cited by examiner

SYSTEM AND METHOD FOR RESOURCE ADAPTIVE CLASSIFICATION OF DATA STREAMS

CROSS REFERENCE TO RELATED APPLICATIONS

This application is a continuation of U.S. patent application Ser. No. 11/530,938 filed Sep. 12, 2006, the contents of which are incorporated by reference herein in their entirety.

STATEMENT REGARDING FEDERALLY SPONSORED RESEARCH AND DEVELOPMENT

This invention was made with Government support under Contract No. H98230-4-03-0001 awarded by the U.S. Department of Defense. The Government has certain rights in this invention.

BACKGROUND OF THE INVENTION

The present disclosure relates generally to data stream classification, and, in particular, to a system and method for resource adaptive classification of data streams.

In recent years, advances in hardware technology have allowed for the automatic and continuous collection of large amounts of data. These continuously growing data sets are referred to as data streams. Data mining is the process of extracting valid, previously unknown, and ultimately comprehensible information from large databases and using it to form a prediction or classification. A data-mining problem is that of classification. The "classification problem" is one in which a large data set (i.e., a training set), consisting of many examples, must be classified. The objective of classification is to develop a classifier based on the examples in the training set. The classification problem has also been widely studied in the context of data streams.

The classification problem faces a number of unique problems in the case of data streams that can be classified in high dimensions because of the exponential number of attribute combinations that can be related to the class variable. In such cases, the large number of potential combinations of attributes creates a natural tradeoff between model incompleteness and computational requirements. For example, each path in a decision tree represents a local subspace for classification purposes. While classifying a test instance, an incorrect decision at a higher level of the tree could lead to a path that defines a poor choice of subspace. The number of possible decision trees varies exponentially with data dimensionality, and each tree may be better suited to a different locality of the data. Many specific characteristics of the test instance cannot be captured during the pre-processing phase on the training data. Therefore, the model is incomplete. When considering computational requirements, a natural solution to this problem is to build multiple decision trees, and construct forests for classification purposes. Often, more robust classifiers are obtained by using majority voting over many groups of decision trees. However, with increasing dimensionality the (time and space) scalability required in the number of trees becomes unmanageable. Furthermore, if the data stream evolves, such a system may significantly degrade for classification purposes.

Similar problems are encountered with the use of rule-based classifiers, typically in the form: $(p_1 \wedge \ldots p_n) \Rightarrow q$, lazy learning methods, and instance specific learning with nearest neighbor classifiers all of which do not scale well and are usually not designed to optimize the discovery of any subspace of the data in high dimensional cases.

BRIEF SUMMARY OF THE INVENTION

Embodiments of the invention include method for classifying data in received in a computer, the method including discretizing the received data, constructing an intermediate data structure from the received data as training instances, performing subspace sampling on the received data as test instances and adaptively classifying the received data based on statistics of the subspace sampling.

Additional embodiments include a system for classifying data in received in a computer, the system including a computer coupled to a memory for receiving the data in blocks smaller than the memory and a process residing in the memory, the process having instructions to construct an inverted index from the blocks of data, construct an inverted list for a range limit of training instances from the blocks of data and sample subspaces on test instances from the blocks of data.

Additional embodiments include a method of classifying streamed data in a system having a server connected to a client computer, the method including receiving streamed data in the server, constructing an inverted index of training instances from the streamed data, sampling subspaces from test instances received from the streamed data, adaptively classifying the streamed data based on intersection points of the sampled subspaces and terminating the subspace sampling when a confidence level is reached, the confidence level being determined by a predetermined number of samples.

Further embodiments include a storage medium with machine-readable computer program code for classifying data, the storage medium including instructions for causing the computer to implement a method, including constructing an inverted index structure including training instances from the data and utilizing the inverted index for resource adaptive classification of the data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF EXEMPLARY EMBODIMENTS

In general, the invention features to a system and method for resource adaptive classification of data streams, which optimize both model completeness and computational requirements. Classification is performed in an instance specific manner, while leveraging on well-chosen subspaces for that instance. In a one implementation, intermediate statistics and data structures are created during data stream processing. These intermediate statistics are leveraged for the final instance-specific classification phase. Construction of the intermediate data structure (training phase) and the test phase can both be performed using one-pass stream computations. Therefore, the framework allows the flexibility of simultaneous processing of training and test streams. A subspace is a subset of dimensions in the data. A training instance is a record from a data set that is used to construct a model for classification as described herein. A test instance is a record that is classified using the model constructed from the training data.

During the test phase, multiple instance-centered subspace samples are used in order to determine the final behavior of the test instance. Each instance-specific subspace sample is locally discriminative for that test instance. The statistics from multiple such samples are combined in order to construct a robust and effective classifier. The use of locally discriminative behavior for constructing subspace samples greatly reduces the number of combinations of dimensions that need to be explored.

Since the classification is based on combining the results from multiple instance-centered models, the classification can be used in an adaptive way in which the number of learners combined depends upon the speed of the data stream and computational resources available. Since data input streams are often bursty, thereby resulting in an unusually large amount of processing time being available for some test instances, and little time being available for others, a resource adaptive approach is implemented to improve the effectiveness of the classification approach.

Figure 1:
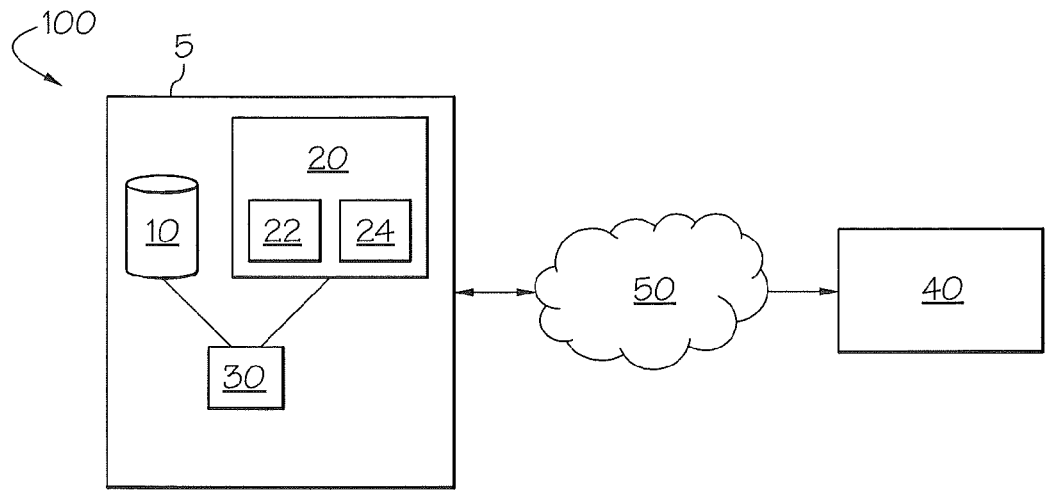
FIG. 1 is a block diagram illustrating an exemplary hardware environment used to implement the exemplary embodiments of the invention.

FIG. 1 is a block diagram illustrating a hardware environment 100 used to implement the exemplary embodiments of the invention. In exemplary hardware environment 100, a computer 5, such as a server, includes one or more processors 30, memory 20 such as random access memory (RAM), a storage medium 10, and assorted peripheral devices (not shown). The peripheral devices usually include one or more fixed and/or removable data storage devices, such as a hard disk, floppy disk, CD-ROM, tape, and the like. Those skilled in the art recognize that any combination of the above components, or any number of different components, peripherals, and other devices, may be used with the computer 5.

In exemplary embodiments, the systems and methods described herein are implemented using application software 22, configured for processing data streams as described herein. Applications software 22 executes under the control of an operating system 24, such as but not limited to z/OS, MVS, AIX, OS/2, WINDOWS NT, WINDOWS, UNIX, etc. Those skilled in the art recognize that any combination of the above software, or any number of different software, may be used to implement the embodiments described herein.

Computer 5 receives data streams, e.g., from client 40 via network 50. Data streams can be stored in memory 20. Classification computations may be performed via processor 30 on data stored in memory 20 via application software 22. For example, application software 22 may receive commands from users for performing various search and retrieval functions, termed queries, against one or more databases stored in the data storage devices or memory 20. Queries may conform to the Structured Query Language (SQL) standard, although other types of queries may also be used without departing from the scope of the invention. The queries invoke functions performed by the application software 22, such as definition, access control, interpretation, compilation, database retrieval, and update of user and system data.

As such, an online analytical processing framework in which pre-stored statistics about a data stream in an underlying data structure can be analyzed via network 50 on computer 5 from a client 40. This data structure is then used for effective instance specific subspace sampling for classification. The methods described herein are especially useful for high dimensional data because of its ability to sample locally important subspaces for classification. As further described herein, an intermediate inverted data structure used to process test instances allows data analysis of data streams that may occur at different rates. Thus, the systems and methods described herein allow processing rates that adapt to data stream rates. For the case of bursty workloads, it is possible to smooth out the processing rate effectively. These implementations make it possible to leverage on periods of slow input rate in order to obtain higher overall accuracy. Thus input rates of data streams that vary considerably over time can be adaptively classified.

Generally, application software 22, the SQL queries, and the instructions derived therefrom, are all tangibly embodied in or readable from a computer-readable medium, e.g. one or more of the data storage devices and/or data communications devices coupled to the computer. Moreover, application software 22, the SQL queries, and the instructions derived therefrom, are all comprised of instructions which, when read and executed by the computer 5, causes the computer 5 to perform the steps necessary to implement and/or use the present invention.

Application software 22 can be implemented to perform data mining. For example, application software 22 can include inter-operable kernels and an extensive pre-processing library that allow data mining or advanced data analysis. In addition, kernel functions, such as "classification" can be implemented in the process.

Classification is performed in an instance specific manner, while leveraging on well-chosen subspaces for that instance. In an exemplary embodiment, intermediate statistics and data structures are created during data stream processing. These intermediate statistics are leveraged for the final instance-specific classification phase. Construction of the intermediate data structure (training phase) and the test phase can both be performed using one-pass stream computations. Therefore, the framework allows the flexibility of simultaneous processing of training and test streams.

During the test phase, multiple instance-centered subspace samples are used in order to determine the final behavior of the test instance. Each instance-specific subspace sample is locally discriminative for that test instance. The statistics from multiple samples are combined in order to construct a robust and effective classifier. The use of locally discriminative behavior for constructing subspace samples greatly reduces the number of combinations of dimensions that need to be explored.

For illustrative purposes, the example of a data stream that contains d dimensions is described as an exemplary implementation of a data stream received on computer 5. The points in the data stream can be denoted by $X\_1 \ldots X\_N \ldots$ Each data point is associated with a unique point identifier that is useful for tracking and indexing purposes. There are k classes in the data that are denoted by $C\_1 \ldots C\_k$.

Figure 2:
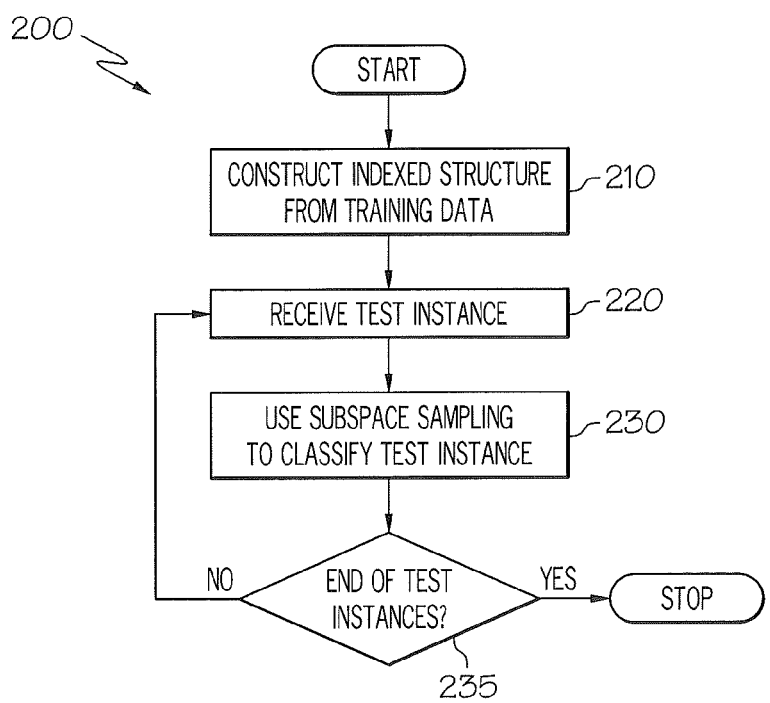
FIG. 2 illustrates a flow chart of an exemplary embodiment of an overall method for resource adaptive classification of data streams.

FIG. 2 illustrates a flow chart of an embodiment of an overall method 200 for resource adaptive classification of data streams. The overall classification method 200 includes two phases of first creating the inverted index for classification and then leveraging it for performing the instance specific classification. As discussed above, at step 210, the inverted index structure for the training data is first constructed. The construction of the inverted index is discussed further with respect to FIG. 2. This inverted index structure is the intermediate data structure that is used for classification purposes. At step 220, a test instance is received. The test instance is classified with the use of the index structure constructed in step 210. At step 230, subspace sampling is used in order to classify the test instance. If further test instances are to be collected, which is determined at step 235, the next test instance is received at step 220. The process continues until a desired number of test instances are received. Once the desired number of test instances is received at step 235, the process stops. Subspace sampling used to classify the test instances at step 230, is described in further detail with respect to FIG. 4.

Figure 3:
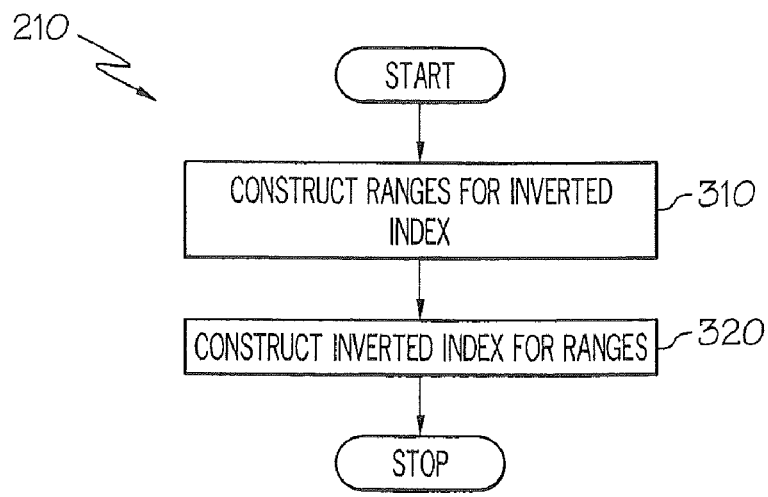
FIG. 3 illustrates a flow chart of an exemplary embodiment of a construction process of a training data structure.

As discussed above, an inverted histogram in the case of a massive data set D can be created, and can require two passes over the data stream. As further discussed above, a single pass over the data stream can approximate this process. It is generally desirable to discretise the data stream into Phi equi-depth ranges, the limits of which can be determined during the first pass over the data stream. A second pass uses the Phi equi-depth range limits to construct the equi-depth histogram. The ranges can be denoted by $R\hat{\ }j\_1 \ldots R\hat{\ }j\_Phi$ for the j-th dimension. The corresponding ranges can be denoted by $[1\hat{\ }j\_1, u\hat{\ }j\_1] \ldots [1\hat{\ }j\_Phi, u\hat{\ }j\_Phi]$, where $1\hat{\ }j\_i$ and $u\hat{\ }j\_i$ are the lower and upper bounds for the i-th range on dimension j. Therefore, for each i in $\{1 \ldots Phi-1\}$, it follows that $u\hat{\ }j\_i=1\hat{\ }j\_\{i+1\}$. The set of data points in the i-th range can be denoted by $V\hat{\ }j\_i$. Therefore, the union of the points over the different ranges is $D=SETUNION\_\{i=1\}\hat{\ }Phi\ V\hat{\ }j\_I$. FIG. 3 illustrates a flow chart of an embodiment of a process 210 of constructing the index training data structure for the classification process. At step 310, the ranges, for the inverted index, as discussed immediately above, are constructed. As described in detail above, the ranges are in the form of equi-depth ranges with an equal number of points in each range. At step 320, the ranges are used to construct an inverted index structure. Specifically, for each range, an inverted list of data points is constructed corresponding to that range. This data structure is used for the purpose of classification.

Each set $V\hat{\ }j\_i$ is divided into sublists that correspond to the k different classes in the data. The k sublists of $V\hat{\ }j\_i$ can be denoted by $W\hat{\ }j\_\{i1\} \ldots W\hat{\ }j\_\{ik\}$. The set of data points in $W\hat{\ }j\_\{i1\} \ldots W\hat{\ }j\_\{ik\}$ are indexed by the corresponding range and class value. Therefore, for each inverted list $W\hat{\ }j\_\{ir\}$, certain additional information can be known, including, but not limited to: the number of points in $W\hat{\ }j\_\{ir\}$; the index r of class $C\_r$ for list $W\hat{\ }j\_\{ir\}$; the upper and lower bounds for the range corresponding to $W\hat{\ }j\_\{ir\}$; and, the identifier list of the data points in $W\hat{\ }j\_\{ir\}$.

It is appreciated that the aforementioned discussion applies to a situation in which inverted lists are constructed in the case of a massive data set. In exemplary embodiment, an inverted list refers to a file that is indexed for multiple attributes if the data in the data set. As discussed, this process can implement two passes over the data. However, it is further appreciated that in the case of a data stream input into computer 5 from network 50, or other source, one pass occurs. Therefore, in order to create the inverted lists in real time, data can be processed block by block. It is desirable for each block size to be smaller than constraints imposed by memory 20. In a one implementation, a block size is identified to be a size much less than the available memory 20, for example, about five percent. Each block is then read into memory 20, and the inverted list is created using memory 20 operations. Therefore, it is possible to perform the required two passes on a block by using only main memory operations.

Referring to the above-discussed notation, for the t-th block, the corresponding data block is denoted by D(t). The ranges for the t-th block are denoted by $R\hat{\ }j\_1(t) \ldots R\hat{\ }j\_Phi(t)$ respectively. The corresponding lists for the t-th block are denoted by $V\hat{\ }j\_1(t) \ldots V\hat{\ }j\_Phi(t)$. The sublists for the different classes are denoted by $W\hat{\ }j\_\{i1\}(t) \ldots W\hat{\ }j\_\{ik\}(t)$. In addition, it is desirable to store the meta-information for each block along with the identifiers of the corresponding inverted lists in memory 20. Since the ranges for the different blocks may change over time because of data evolution, the meta-information is stored in the data points.

Once the inverted lists have been constructed, they can be leveraged in order to sample subspaces that are local to that test instance. A subspace classifier can then be used to construct discriminative subspaces specific to the locality of the particular test instance, with the use of the statistics that are stored in the inverted lists. The final classification of the instance is determined as a robust composite of the classification behavior of different sample subspaces. The aforementioned training process concentrates on the construction of this intermediate statistical structure. The summary information can then be leveraged at classification time in an instance-specific way, which provides a high level of flexibility.

Figure 4:
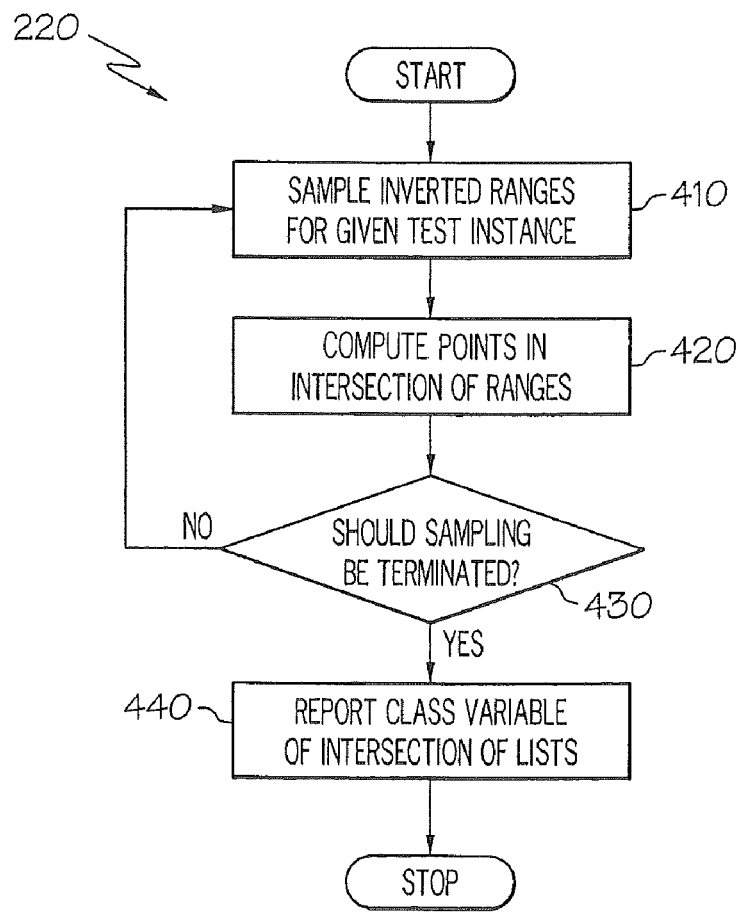
FIG. 4 illustrates a flow chart of an exemplary embodiment of a classification process of a given test instance.

The subspace classifier works with the use of repeated subspace samples, which are specific to a given test instance. The intersection of two or more inverted lists determines the points in a corresponding subspace. For a given test instance, it is desirable to perform the intersection of only those lists which are relevant to it. For each of the d dimensions, one list (such that the range contains the corresponding attribute value) can be relevant to a particular record. The index of the relevant range for the test instance T corresponding to dimension j can be denoted by $i\_j$. The corresponding range can be denoted by $R\hat{\ }j\_\{i\_j\}(t)$. The d inverted lists that are relevant to the test instance T at time t are denoted by $V\hat{\ }1\_\{i\_1\}(t) \ldots V\hat{\ }d\_\{i\_d\}(t)$. FIG. 4 illustrates a flow chart of an embodiment of a method 220 for performing classification from the inverted index structure for a given test instance once an instance is received. At step 410, the inverted ranges are sampled for a given test instance. At step 420, the points in the intersection of these ranges are computed. The classification behavior of the majority classes among this set of points represents the classification behavior of the test instance. At step 430, it is determined whether or not sampling should be terminated. This determination step is described in more detail with respect to FIG. 5. If it is determined that sampling should be terminated then the majority class among the subspace samples is reported at step 440. The majority of class from the subspace samples is reported to the user. The user can use this report as a label as a class label of the relevant test instance. If sampling should not be terminated, then step 410 can be repeated.

In data sets received into computer 5, some combinations of dimensions (or subspaces) can have deeper relationships with the class variable. Furthermore, different sets of subspaces can be more relevant to different test instances because of local variations in subspace behavior over different test instances. However, because of the use of pre-processing methodology implemented in memory 20, the local behavior of a test instance can be accurately reflected. As discussed above, higher accuracy in the case of high dimension data is desirable since there are an exponential number of attribute combinations. Therefore, the (local) importance of an inverted list $V\hat{\,}j\_\{i\_j\}$ (t) is quantified. To perform this quantification, the gini-index of the list local to the particular test instance T is used. The gini-index of each dimension measures the degree of skew across the different classes. The fractional presence of the different classes for each attribute can be denoted by $f\hat{\,}j\_1(t, T) \ldots f\hat{\,}j\_k(t, T)$. The value of $G\hat{\,}j(t, T)$ varies between (1/k) and 1. For an equal distribution across classes, the value is 1/k. For a data set skewed towards a single class, the value approaches 1. The gini-index is specific to the local behavior of test instance T, since it uses only a particular set of inverted lists that are unique to that data locality.

After determining the gini-index, a subspace sampling process is then implemented. For a test instance T, $S(T)=\{i\_1 \ldots i\_d\}$ can be the indices of the inverted lists corresponding to those attribute ranges. A subset Q from S(T) is then sampled. This sampling uses the (local) gini-index in order to bias the instance-specific choice of the dimensions. The details of the biasing process are discussed in further detail in the description below. The set Q defines the local instance-specific subspace of dimensions that are picked in the current iteration. The intersection of the data points in this set of dimensions is denoted by U(Q), and is computed as follows: $U(Q)=SETINTERSECTION\_\{i\ in\ Q\}\ V\_I$.

The intersection of different lists can generally be computed in an efficient way because of the inverted representation of the data. In general, with increasing number of dimensions in Q, the set U(Q) reduces in size, and is also more biased towards a particular class variable.

The set $Q$ defines a local subspace for the test instance, and the dominant class in that subspace is used to update the class statistics for that test instance. The results from multiple such subspaces are combined in order to derive the final result. As discussed further below, the number of sample subspaces n_s picked depends upon the current load on the system 100.

When an unbiased choice of dimensions is used, the accuracy can be high at the end of the process, but a larger number of subspace samples n_s are required to reach the final accuracy. When the choice of dimensions is biased with the use of the gini-index, then a small number of iterations can provide a high level of accuracy, but the final accuracy even with a large number of samples is not as high. Thus, in an implementation for static data sets with a large pool of available resources, it can be desirable to use the unbiased method. A greater bias may be needed for faster applications such as data streams into computer 5.

Figure 5:
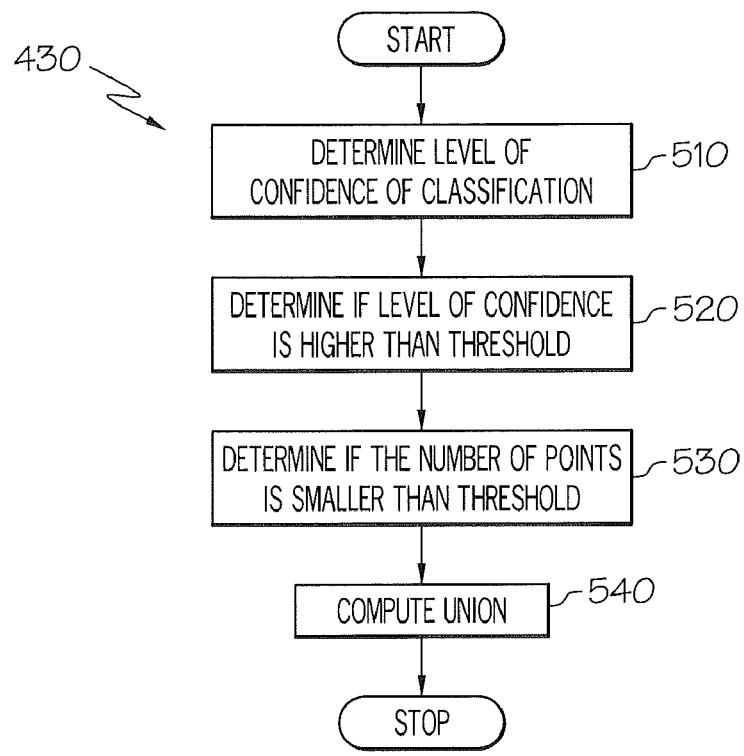
FIG. 5 illustrates a flow chart of an exemplary embodiment of a computation process of the termination criterion for subspace samples.

Sampling generally continues when a level of confidence of classification is attained. FIG. 5 illustrates a flow chart of an embodiment of a method 430 for computation of the termination criterion for subspace samples. In general, the level of confidence of the classification is determined at step 510. At step 520, it is determined whether the confidence level is above user-specified threshold. At step 530, it is determined whether the number of subspace samples is larger than the user-specified threshold. The user specified threshold is computed using a procedure discussed with respect to FIG. 6. In general, a Boolean result is returned at steps 520 and 530. At step 540, the union of the results from steps 520 and 530 is returned.

Figure 6:
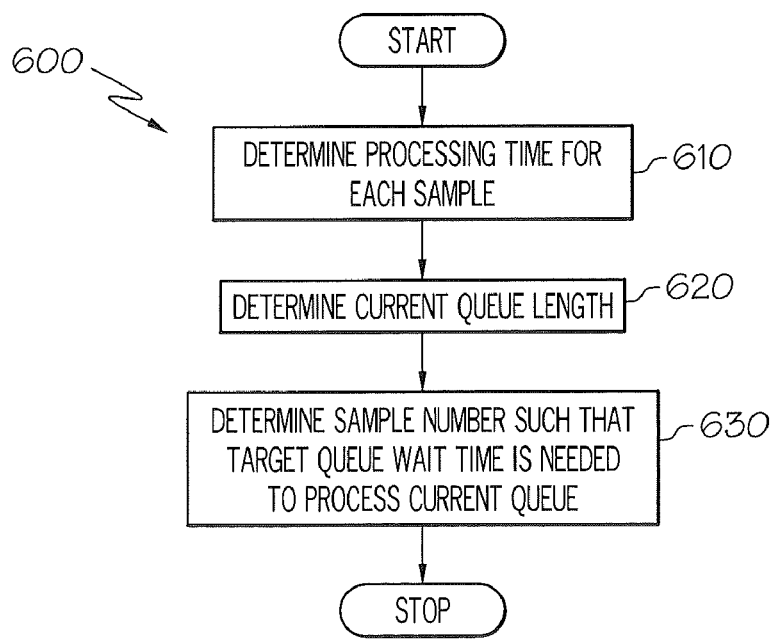
FIG. 6 illustrates a flow chart of an exemplary embodiment of a process used for computing the number of subspace samples.

At each moment of time, a queue of test instances is maintained in order to perform the classification, and to determine the number of samples needed to perform the classification. FIG. 6 illustrates a flow chart of an embodiment of a method 600 used for computing the number of subspace samples. Method 600 is implemented in order to compute the target number of subspace samples in step 530 of FIG. 5. In order to compute the number of subspace samples, the time required to complete the computation for one subspace sample is measured at step 610. The current queue length of test instances is also measured at step 620. The target queue waiting time in order to determine the target number of subspace samples is then used at step 630. In general, the threshold is user-determined and can vary widely depending on the application. It is understood that the user threshold can have many values in different implementations.

The number of subspace samples n_s used for the sampling process can determine which implementation of the above-described methodologies is implemented. In general, a larger number of subspaces provides greater accuracy, but also increases the running time. Therefore, the value of n_s is advantageously determined from the current speed of the stream. If the stream is bursty, then it is desirable to continuously adjust the value of n_s to account for the corresponding changes. In a one implementation, a historical processing rate of the test instances for each sampling iteration of the algorithm (i.e. for n_s=1) is tracked and recorded. Correspondingly, the value of n_s is continuously adjusted. With t' being the average time required for each sample during the classification process, the value of t' is computed by using the average processing time in the history of the stream. Then, the expected time for classification of a test instance with the use of n_s samples is given by n_s·t'.

As discussed above, at each moment of time, a queue of test instances is maintained in order to perform the classification. It is desirable to perform the classification process at a rate so that the expected time of processing the queue is equal to a target queue waiting time. With t_w being the target queue waiting time, and q_c being the current queue length, the average time for processing the current queue is equal to q_c·n_s·t'. It is desirable for the current queue to be fully processed by the time that the target time t_w has elapsed. Therefore, it is further desirable that the number of subspace samples n_s to be chosen so that the following relationship is satisfied: q_c·n_s·t'=t_w.

The value of q_c is can be at least 1, since the current test instance being processed is included in the queue. From the above relationship, the value of the number of subspace samples n_s is computed as follows: n_s=t_w/(q_c·t').

The value of the number of subspace samples n_s is continuously re-calculated each time stamp with the new value of q_c. The value of t' can also vary slightly with time, in order to account for random variations in processor 30 efficiency. In general, a waiting time of t_w is the steady state required by application 22. However, when the stream is bursty, it can lead to waiting times that are larger or smaller than the target values. For example, when a large number of data points are suddenly received in the data stream, say via network 50, the current queue size q_c increases. Correspondingly, the number of subspace samples n_s reduces, and the processing rate speeds up. However, the waiting times can increase. In contrast, when the stream is slow, the queue lengths are relatively small, and a larger amount of time can be spent on each test instance.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for classifying data received in a computer, the system comprising:
   a computer coupled to a memory for receiving the data in blocks smaller than said memory; and
   a process residing in said memory, the process having instructions to:
      construct an inverted index from said blocks of data;
      construct an inverted list for a range limit of training instances from said blocks of data, the range limit corresponding to a set of equi-depth ranges with an equal number of points in each range;
      sample subspaces on test instances from said blocks of data; and
      determine a class label based on a computation of an intersection of subspace samples, said intersection being between two or more of said inverted lists;
      wherein said process further includes instructions to continue subspace sampling until a number of samples are attained based on a target queue wait time.

2. The system as claimed in claim 1 wherein said process further comprises instructions to apply a confidence level on a set of samples to determine termination of said subspace sampling.

3. A method for classifying data received in a computer, the method comprising:
   receiving, in the computer, data in blocks smaller than a memory;
   constructing, in the computer, an inverted index from said blocks of data;
   constructing, in the computer, an inverted list for a range limit of training instances from said blocks of data, the range limit corresponding to a set of equi-depth ranges with an equal number of points in each range;
   sampling subspaces on test instances from said blocks of data; and
   determining, in the computer, a class label based on a computation of an intersection of subspace samples, said intersection being between two or more of said inverted lists;
   wherein said method further includes instructions to continue subspace sampling until a number of samples are attained based on a target queue wait time.

4. The method as claimed in claim 3 wherein said method further comprises instructions to apply a confidence level on a set of samples to determine termination of said subspace sampling.

5. A system comprising a server connected to a client computer, the system for performing a method, the method comprising:
   receiving streamed data in the server;
   constructing an inverted index of training instances from the streamed data;
   sampling subspaces from test instances received from the streamed data;
   adaptively classifying the test instance of the streamed data based on intersection points of said sampled subspaces; and
   continuing sampling subspaces until a number of samples are attained based on a target queue wait time.

6. The system as claimed in claim 5, further comprising terminating said subspace sampling when a confidence level is reached, said confidence level being determined by a predetermined number of samples.

7. The system as claimed in claim 5, further comprising instructions for applying a confidence level on a set of samples to determine termination of said subspace sampling.

8. A storage medium with machine-readable computer program code for classifying data, the storage medium including instructions for causing said computer to implement a method, comprising:
   constructing an inverted index structure including training instances from the data;
   utilizing said inverted index structure for resource adaptive classification of a test instance of the data;
   computing a maximum number of samples for a given subspace using queue lengths of subspace sampling;
   determining termination of subspace sampling based on a number of samples calculated using said queue lengths; and
   determining said number of samples based on a target queue waiting time.

9. The storage medium as claimed in claim 8, further comprising instructions to:
   construct said inverted index structure by discretizing the data;

construct an inverted list for a range containing a list of training instances from the data, the list of training instances including said training instances whose attribute values lies within said range; and classify a test instance of the data from an intersection of sampled subspaces each associated with an inverted list.

10. A method for classifying data, the method, comprising:

constructing, on a computer, an inverted index structure including training instances from data; and utilizing said inverted index structure for resource adaptive classification of a test instance of the data;

computing, on the computer, a maximum number of samples for a given subspace using queue lengths of subspace sampling;

determining termination of subspace sampling based on a number of samples calculated using said queue lengths; and determining said number of samples based on a target queue waiting time.

11. The method as claimed in claim 10, further comprising:

constructing said inverted index structure by discretizing the data;

constructing an inverted list for a range containing a list of training instances from the data, the list of training instances including said training instances whose attribute values lies within said range; and classifying a test instance of the data from an intersection of sampled subspaces each associated with an inverted list.

* * * * *